United States Patent
Joshi et al.

(10) Patent No.: US 8,706,730 B2
(45) Date of Patent: Apr. 22, 2014

(54) SYSTEM AND METHOD FOR EXTRACTION OF FACTOIDS FROM TEXTUAL REPOSITORIES

(75) Inventors: Sachindra Joshi, New Delhi (IN); Raghuram Krishnapuram, New Delhi (IN); Nimit Kumar, Bhagalpur (IN); Kiran Mehta, Castro Valley, CA (US); Sumit Negi, New Delhi (IN); Ganesh Ramakrishnan, New Delhi (IN); Scott R Holmes, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 2743 days.

(21) Appl. No.: 11/321,177

(22) Filed: Dec. 29, 2005

(65) Prior Publication Data
US 2007/0162447 A1     Jul. 12, 2007

(51) Int. Cl.
*G06F 17/30* (2006.01)
(52) U.S. Cl.
USPC .......................... 707/737; 707/738; 707/740
(58) Field of Classification Search
None
See application file for complete search history.

(56) References Cited

U.S. PATENT DOCUMENTS

| | | | | |
|---|---|---|---|---|
| 4,974,191 A * | 11/1990 | Amirghodsi et al. | | 707/4 |
| 5,623,660 A | 4/1997 | Josephson | | |
| 5,819,259 A * | 10/1998 | Duke-Moran et al. | | 707/3 |
| 5,873,056 A * | 2/1999 | Liddy et al. | | 707/3 |
| 6,081,774 A * | 6/2000 | de Hita et al. | | 707/3 |
| 6,097,792 A | 8/2000 | Thornton | | |
| 6,460,029 B1 * | 10/2002 | Fries et al. | | 707/3 |
| 7,853,544 B2 * | 12/2010 | Scott et al. | | 706/46 |
| 8,155,951 B2 * | 4/2012 | Jamieson | | 704/10 |
| 2003/0004914 A1 * | 1/2003 | McGreevy | | 707/1 |
| 2003/0217052 A1 * | 11/2003 | Rubenczyk et al. | | 707/3 |
| 2004/0143484 A1 | 7/2004 | Kapadia et al. | | |
| 2006/0224582 A1 * | 10/2006 | Hogue | | 707/6 |
| 2010/0063799 A1 * | 3/2010 | Jamieson | | 704/9 |

FOREIGN PATENT DOCUMENTS

WO     WO-0065422     11/2000

* cited by examiner

*Primary Examiner* — Debbie Le
(74) *Attorney, Agent, or Firm* — Jeffrey T. Holman

(57) ABSTRACT

A method (400) is disclosed of extracting factoids from text repositories, with the factoids being associated with a given factoid category. The method (400) starts by training a classifier (230) to recognize factoids relevant to that given factoid category. Documents or document summaries relevant to the given factoid category is next collected (410) from the text repositories. Sentences having a predetermined association to the given factoid category is extracted (420) from the documents or said document summaries. Those sentences are classified (440), in a noisy environment, using the classifier (230) to extract snippets containing phrases relevant to the given factoid category. It is the extracted snippets that are the factoid associated with the given factoid category.

20 Claims, 7 Drawing Sheets

SYSTEM AND METHOD FOR EXTRACTION OF FACTOIDS FROM TEXTUAL REPOSITORIES

FIELD OF THE INVENTION

The present invention relates generally to extracting information from a database and, in particular, to extracting factoids from textual repositories, a particular embodiment of which is the World Wide Web.

BACKGROUND

Information extraction may be described as the task of identifying facts from documents about a given entity. Information retrieval on the other hand returns a subset of documents that are relevant to a given query. Many situations exist in which it is desirable to extract key pieces of information from databases, like a collection of documents. For example, in transcribed voice mail messages, the name of the caller and any return numbers that were left are crucial for summarizing the call. Also, when résumés are submitted to a company along with a cover letter, it is desirable to extract the job objective and salary requirements of the applicant, in order to determine if a suitable match exists.

Information extraction is made difficult because many ways exist of expressing the same fact. For example, following three sentences contain the same information in different forms:

BNC Holdings Inc named Ms G Torretta as its new chairman.

Nicholas Andrews was succeeded by Gina Torretta as chairman of BNC Holdings Inc.

Ms. Gina Torretta took the helm at BNC Holdings Inc.

When the information to be extracted is present in a single sentence, that information may be referred to as "localized information". In contrast with localized information, the information may be spread across several sentences. For example:

After a long boardroom struggle, Mr Andrews stepped down as chairman of BNC Holdings Inc. He was succeeded by Ms. Torretta.

The spread of information across several sentences adds further difficulty to the task of information extraction.

Hitherto methods for the extraction of facts from documents using templates have been proposed. Such methods collect contextual clues (both syntactic and semantic) around hand picked "patterns", and then generalize those patterns. These generalized patterns are usually represented using regular expression constructs. Considerable manual effort and time has to be spent in the construction of new templates and marking patterns in free text, and as a result these methods are time consuming. Furthermore, such methods cannot be readily re-used for extracting new types of facts.

In many situations, it is good enough to identify a sentence or groups of sentences that contain the required pieces of information. As an example, when information pertaining to "management changes in companies" is to be identified, it may be good enough to identify sentences that describe new appointments. A sentence or a group of sentences may be termed a "snippet". A snippet that contains some fact is termed a "factoid".

Factoids may be categorized based on what information they convey. For example, factoids that describe new appointments in companies may be grouped together under a "Change in Management" category. Thus, "Change in Management" is an example of a factoid category.

Different methods have been proposed to identify portions of data in a document that a user deems relevant or important in terms of information content. The method disclosed in U.S. Pat. No. 6,842,796 entitled "Information extraction from documents with regular expression matching" provides techniques for exploiting the readily-identifiable structure of language to explicitly identify portions of data in a document that a user seeks to be identified, such as relevant or important information. "Regular expressions" are used to identify the information-bearing portions of a document. However, this method requires considerable manual effort for generating these expressions.

A need therefore exists for an improved method for identification and extraction of factoids.

SUMMARY

It is an object of the present invention to substantially overcome, or at least ameliorate, one or more disadvantages of existing arrangements.

According to an aspect of the present invention, there is provided a method of extracting factoids from text repositories, with the factoids being associated with a given factoid category. The method starts by training a classifier to recognise factoids relevant to that given factoid category. Documents or document summaries relevant to the given factoid category is next collected from the text repositories. Sentences having a predetermined association to the given factoid category is extracted from the documents or said document summaries. Those sentences are classified, in a noisy environment, using the classifier to extract snippets containing phrases relevant to the given factoid category. It is the extracted snippets that are the factoid associated with the given factoid category.

According to another aspect of the present invention there is provided a computer program product including a computer readable medium having recorded thereon a computer program for implementing the method described above.

Other aspects of the invention are also disclosed.

BRIEF DESCRIPTION OF THE DRAWINGS

One or more embodiments of the present invention will now be described with reference to the drawings, in which.

DETAILED DESCRIPTION

As explained in the Background section above, a factoid is a sentence or a group of sentences that contains some fact. Also, factoids which convey similar information belong to the same factoid category. "Revenue Growth", "Change in Management", "Launch of a New Product" and "Merger and Acquisition" are examples of factoid categories. "Company x reported a revenue growth of 10% in the fourth quarter" is an example of a factoid for the "Revenue Growth" factoid category.

The World Wide Web (Web) has exploded from a few thousand pages to several billion pages during the last few years. The Web has become the most important source of information for many industries. Several newspapers, trade journals, business magazines and other related sources are published "online". The Web is also used as a medium for publishing press releases. In addition to the Web, there are other large document repositories such as emails, message boards, etc. These sources of information are valuable in identifying factoids related to particular factoid categories. However, due to the sheer size of such information repositories, the identification and extraction of factoids has to be automated for such to be of any value.

A system and a method are therefore proposed for extracting factoids from content automatically sourced from such document repositories. In this disclosure, by document, we refer to an entire document as well as to its summary (as is often provided by search engines). The proposed system and method extract factoids for any new factoid category with limited human intervention.

Figure 1:
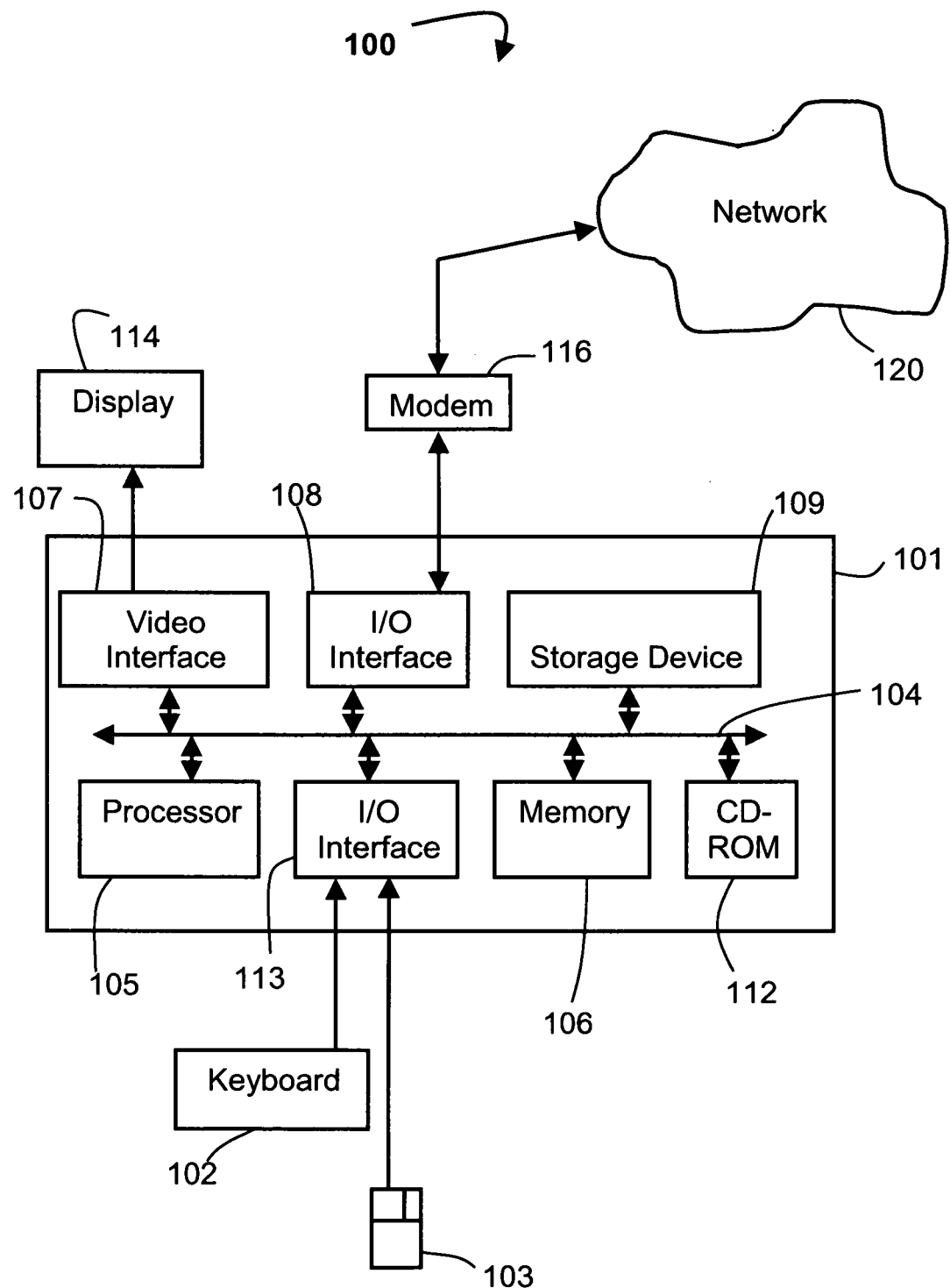
FIG. 1 shows a schematic block diagram of a system for extracting sales driver trigger events from content automatically sourced from the Web.

FIG. 1 shows a schematic block diagram of the system 100 for extracting sales driver factoids from content automatically sourced from the Web. The system 100 is formed by a computer module 101, input devices such as a keyboard 102 and mouse 103, and output devices including a display device 114. A Modulator-Demodulator (Modem) transceiver device 116 is used by the computer module 101 for communicating to and from a communications network 120, including the Internet.

The computer module 101 typically includes at least one processor unit 105, and a memory unit 106. The module 101 also includes a number of input/output (I/O) interfaces including a video interface 107 that couples to the video display 114, an I/O interface 113 for the keyboard 102 and mouse 103, and an interface 108 for the modem 116. The modem 116 is typically incorporated within the computer module 101, for example within the interface 108. A storage device 109 is provided and typically includes at least one hard disk drive. A CD-ROM drive 112 is typically provided as a non-volatile source of data. The components 105 to 113 of the computer module 101, typically communicate via an interconnected bus 104 and in a manner which results in a conventional mode of operation of the computer system 100.

The proposed method consists of two phases, namely a training phase where a classifier is trained for each given factoid category, and a deployment phase where the trained classifiers are used to identify, from text repositories such as the Web, factoids associated with those factoid categories. The proposed method is implemented in the system 100 through software, such as an application program, executing within the system 100. The software may be stored in a computer readable medium, and is loaded into the computer module 101 from the computer readable medium, and then executed by the processor 105. A computer readable medium having such software or computer program recorded on it is a computer program product. The term "computer readable medium" as used herein refers to any storage or transmission medium that participates in providing instructions and/or data to the computer system 100 for execution and/or processing.

Figure 2:
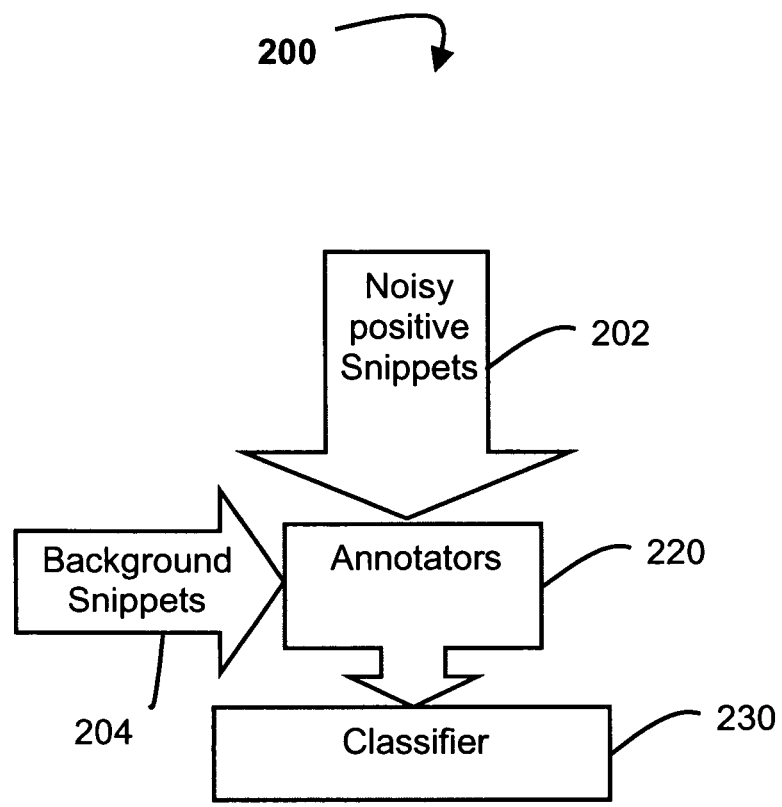
FIG. 2 shows a schematic flow diagram of a training phase where a classifier, associated with a particular sales driver, is trained.

FIG. 2 shows a schematic flow diagram of the training phase 200 of the method where a classifier 230, associated with a particular factoid category, is trained using snippets. A snippet may be defined as a collection of sentences from a document and relating to a single topic. Typically, the number of sentences in each snippet does not exceed 3 or 4.

Traditionally, a classifier needs a set of positive and a set of negative examples to be trained. However, to obtain such sets manual tagging of examples is required, which is both expensive and time consuming.

In order to train the classifier 230, the training phase 200 uses training data in the form of a collection of background snippets 204 and a collection of noisy positive snippets 202. As the term suggest, the collection of noisy positive snippets 202 also contains snippets not belonging to a positive class for the factoid category under consideration.

The collection of background snippets 204 is formed by gathering a random collection of content from the text repository. The number of background snippets in the collection 204 is preferably several hundreds of thousand.

The collection of noisy positive snippets 202 is preferably gathered from the text repository using a search engine, and in a manner described in more detail below. One specific embodiment of this procedure which is discussed in this disclosure is the collection of documents from Web using a search engine, such as Google (www.google.com).

The training phase 200 further includes a set of annotators 220 which annotates the snippets from the collection of noisy positive snippets 202 and the collection of background snippets 204 by tagging entities contained therein that are useful. The tags, and the expressions in the snippets annotated with those tags, are manually determined based upon the nature of the factoid category. Examples of the tags used during the annotation are:

People Names;

Company/Organization Names;

Product Names;

Location Names;

Count Tags; and

Currency Tags.

The annotation performed by the set of annotator 220 serves two purposes, namely generalization and optimization of model size. The generalization involves transforming specific snippets into general snippets. For example, the snippet "IBM made a profit of $250 billion dollars in the year 1996" is generalized to "ORGANIZATION made a profit of CURRENCY in TIME_PERIOD". The generalisation will cause the classifier 230 to learn to identify all such general events.

The optimization of the model size is required because machine learning based techniques, such as classification, succumb to the problem of over fitting on training data in cases where there are too many model parameters. Without annotation, each snippet would be unique due to the individual expressions contained therein. With millions of person names, company names, place names, dates, currency and time expressions in documents, the number of model parameters required would place a large burden on memory and time resources within the system 100. The annotation avoids over fitting by replacing the individual expressions with associated tags. Table 1 below provides example individual expressions associated with tags.

In order to train the classifier 230 to recognise all variations of factoids, the noisy positive snippets 202 used for training the classifier 230 should include as many variations in which the factoids for the particular factoid category may be expressed as possible. The number of snippets in the collection of noisy snippets 202 therefore has to be large.

TABLE 1

| TAGS | Individual expressions |
| --- | --- |
| NAME | Bernard Menzes |
|  | Milind Sohoni |
|  | Dan Klien |
| PLACE | South Minnesota |
|  | North Carolina |
|  | London |
| TIME_PERIOD | 24$^{th}$ Jan., 2004 |
|  | Oct. 11, 1999 |
|  | Tuesday, Mar. 15, 2003 |
| CURRENCY | $ 15 million |
|  | 45 billion pounds |
|  | 85 cents |
| ORGANIZATION | World Health Organization |
|  | Sun Microsystems |
|  | Max New York Life Insurance |

The manner in which the training phase 200 gathers a large collection of noisy positive snippets 202 is now described in more detail. In the preferred implementation the large collection of noisy positive snippets 202 is gathered from the Web using a search engine by executing user specified queries, with the user specified queries related to the factoid category under consideration. For example, for the factoid category: "Change in Management" the user specified query may be the phrase "new CEO". In this instance the phrase "new CEO" is considered to be strongly correlated with the "Change in Management" factoid category.

Most of the results obtained in response to such a query would relate to events regarding the appointment of a new Chief Executive Officer (CEO) in some company. However, the results may also include some results not related to a change in management event. Therefore, the set of documents referenced by the results of the user specified query form a set of noisy positive documents for the factoid category: "Change in Management".

The collection of noisy positive snippets 202 is gathered from the set of noisy positive documents through the use of several heuristics. The heuristics are specific to the factoid category under consideration, and are chosen by a user.

In the simplest case, all the sentences in a document that contain the query phrase or words used to gather the set of noisy positive documents are used as noisy positive snippets. Alternatively, a window may be formed around the location of the query phrase or words in each document and all words appearing within the windows are treated as noisy positive snippets for the factoid category under consideration.

In yet another alternative implementation, all sentences contained in the noisy positive documents that include a given set of tags are used as the noisy positive snippets for the factoid category under consideration. For example, the inclusion of a person name and a designation tag in a sentence from a noisy positive document may be used to include that sentence in the set of noisy positive snippets 202.

The operation of the heuristics is further described with reference to an example. In the example the factoid category for which the classifier 230 is to be trained is the factoid category: "Leadership Change". As described above, the collection of background snippets 204 used is a random sample of content from the Web. In order to extract the collection of noisy positive documents the search phrase "new ceo" is entered into a Web search engine. Typically such a general search phrase would result in a large number of search results.

Figure 5A:
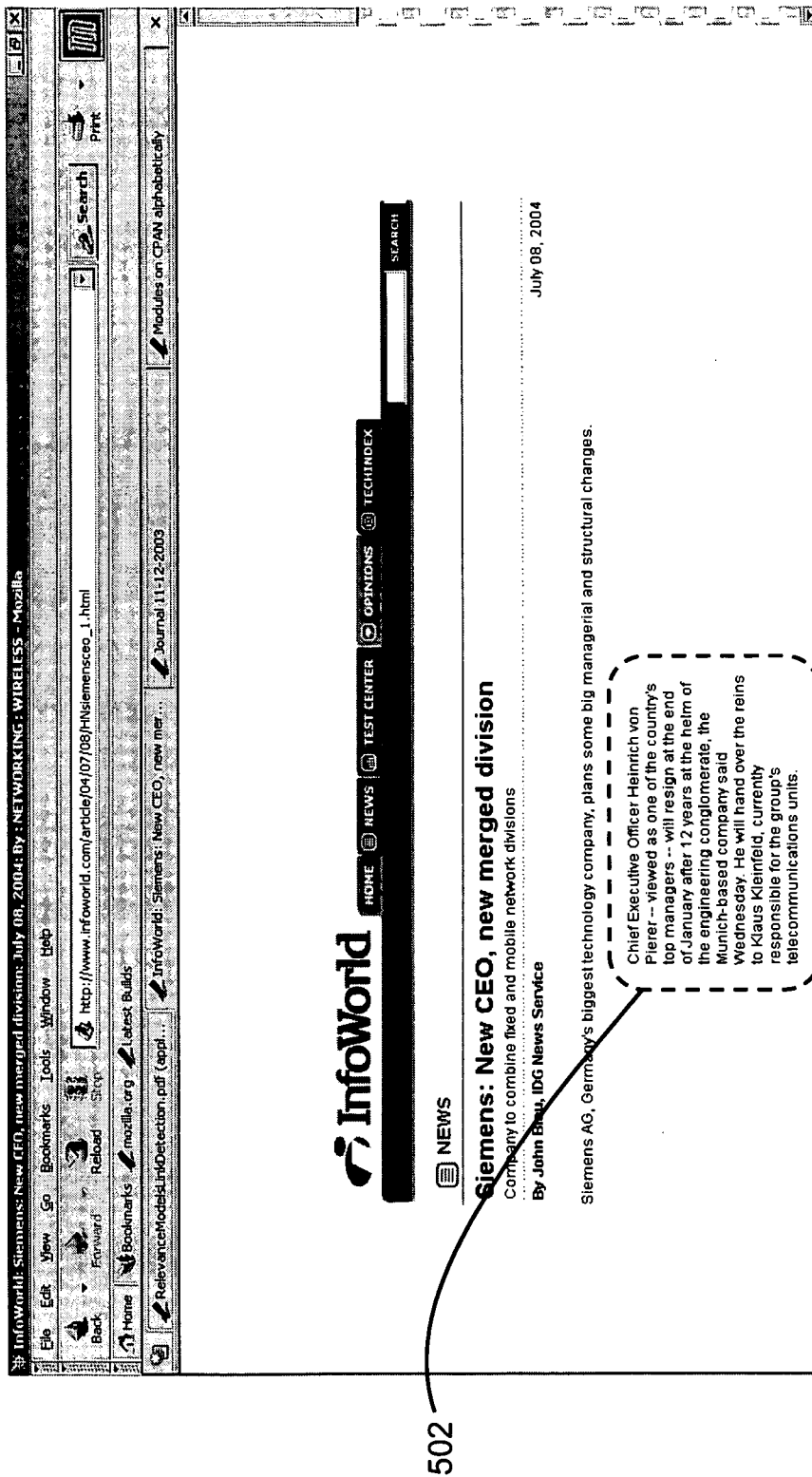
FIGS. 5A to 5C show portions of an example Web page referenced by a first listing in results from an example Web search.
Figure 5B:
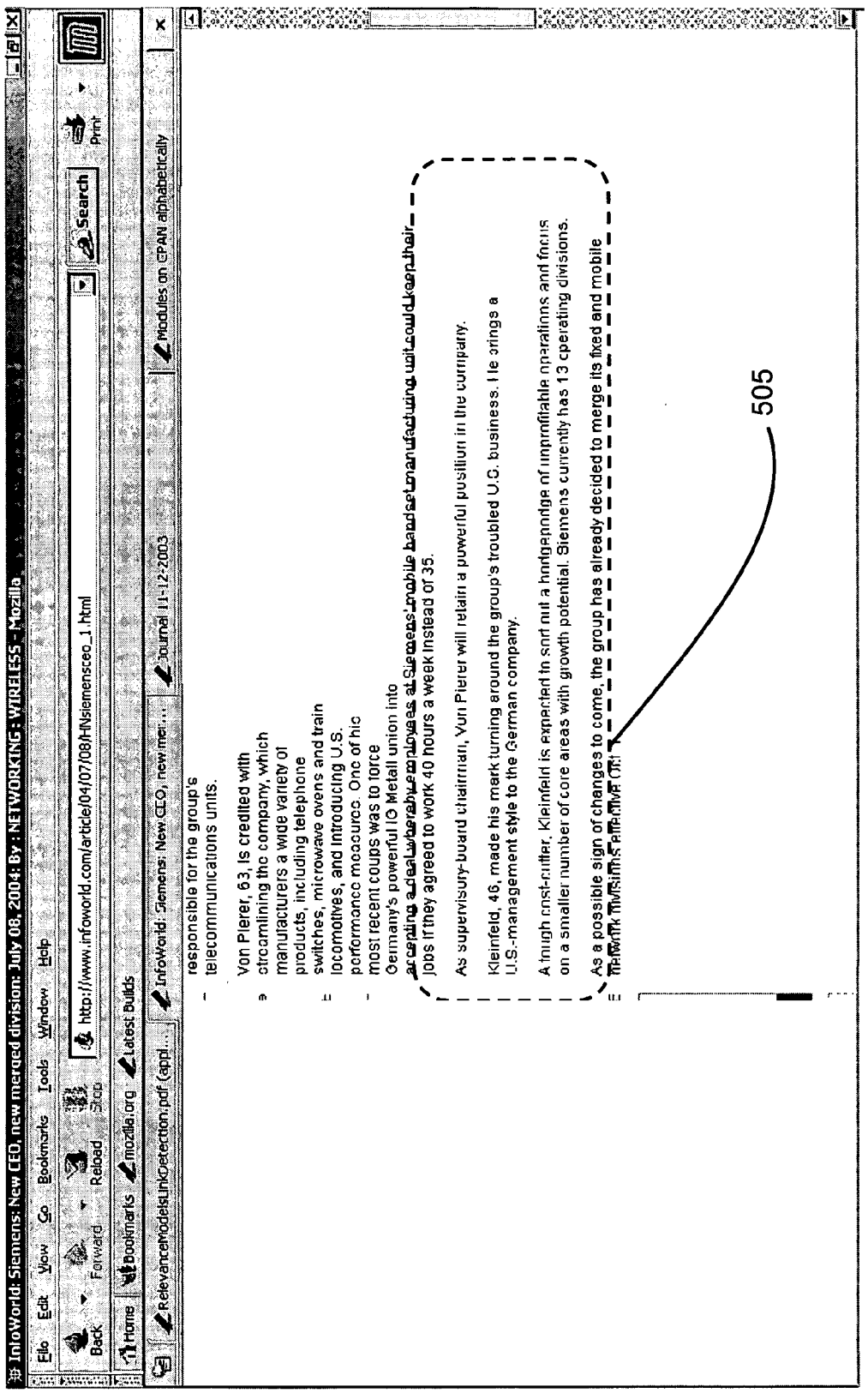

FIG. 5A shows an example Web page referenced by the first listing in the results of the search. The Web page includes an article 502 published by InfoWorld relating to an announcement that Siemens has appointed a new Chief Executive Officer. However, not all sentences in this Web page are factoids relating to the factoid category: "Leadership Change", as is clear from FIG. 5B wherein a further portion 505 of that article 502 is shown.

Figure 5C:
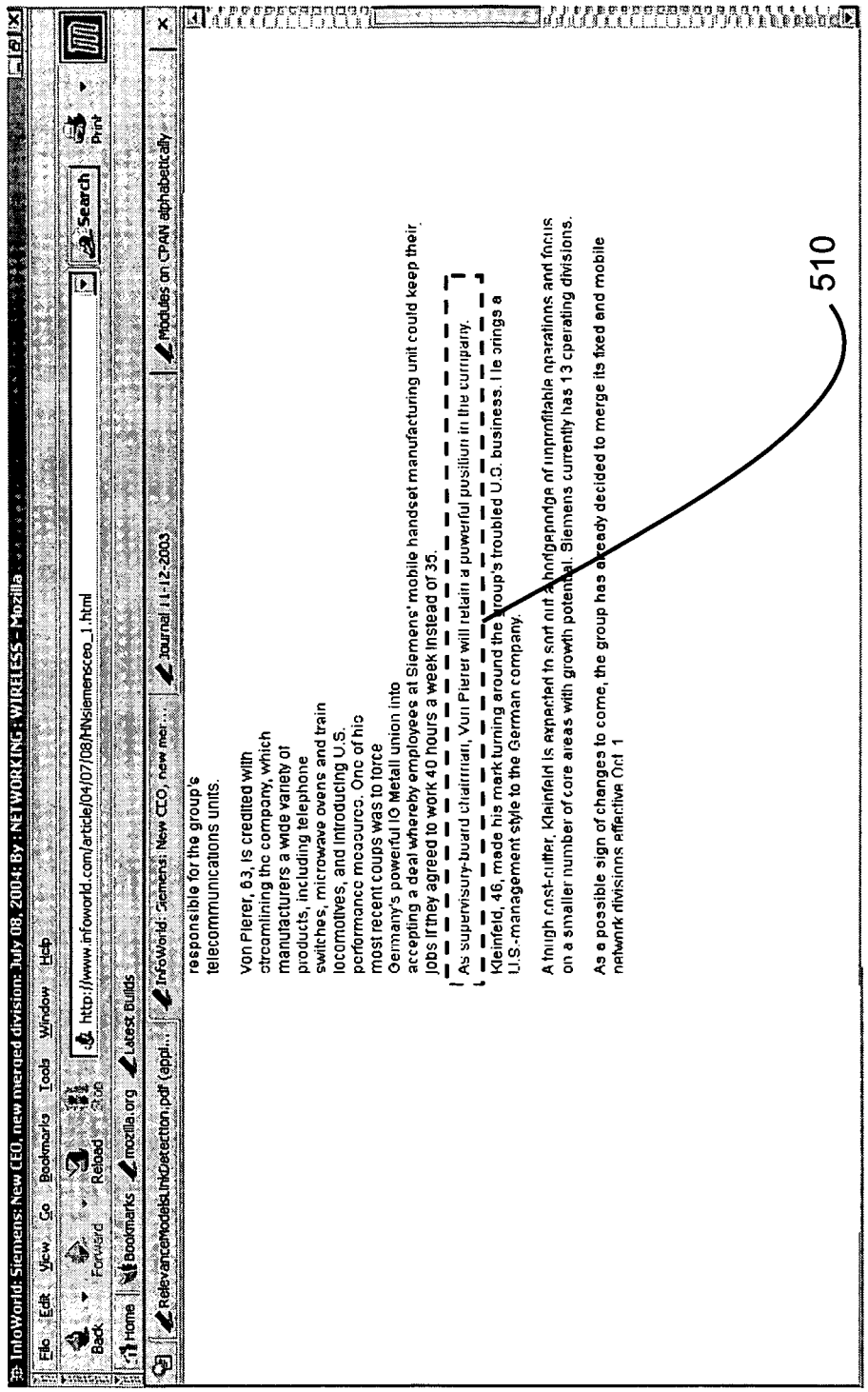

FIG. 5C shows yet another portion of the article 502 on the example Web page. Using a heuristic which identifies sentences in the Web page that include a person name and a designation tag would identify the snippet 510 as a snippet associated with a "leadership change" factoid category. However, that sentence is in fact noise as that sentence does not relate to a leadership change.

Figure 3:
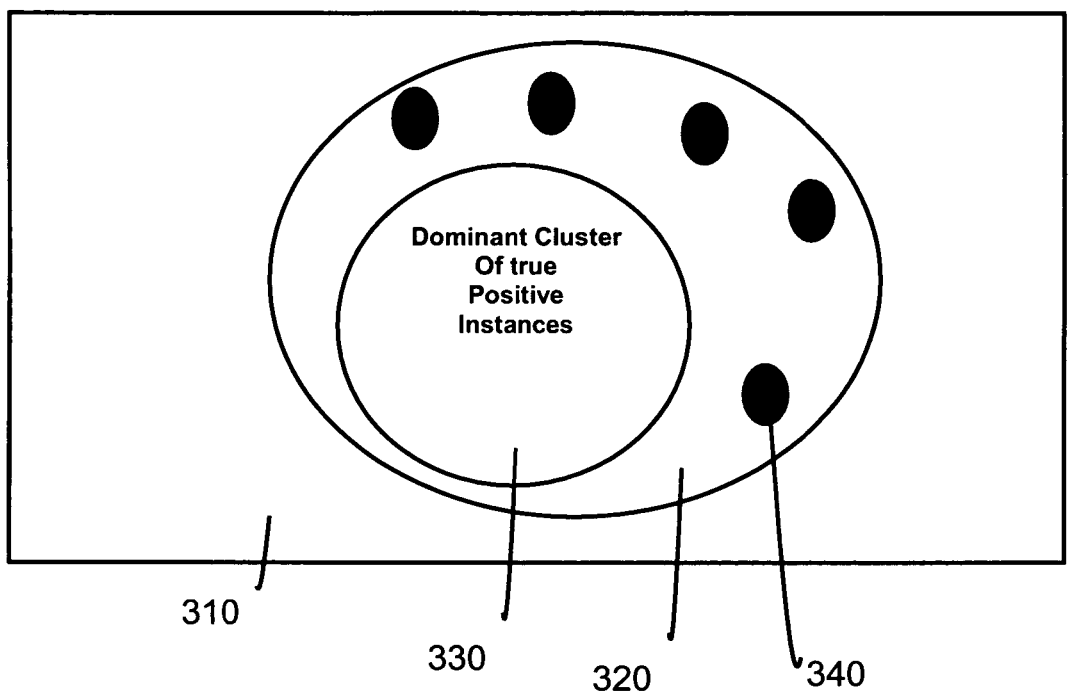
FIG. 3 graphically illustrates the spread of snippets, and their classification.

FIG. 3 graphically illustrates the spread of snippets, and their classification. A large number of background snippets 310 exist. A much smaller collection of noisy positive snippets 320 exists. The collection of noisy positive snippets 320 includes actual positives 330, which forms a dominant cluster, and noise 340 distributed within the collection of noisy positive snippets 320 as small clusters.

Referring again to FIG. 2, following the gathering and annotation of the set of noisy positive snippets 202 and the set of background snippets 204, the classifier 230 is trained using any known classifier training method known in the art, such as the naïve Bayes classifier.

Due to the inclusion of noise in the positive examples used for training, the following steps of transductive classification are resorted to:

1. Make the assumption that the true instances of the positive snippets form a dominant cluster as illustrated in FIG. 3;
2. Train the classifier 230 from the annotated sets of background snippets 204 and noisy positive snippets 202;
3. Iteratively refine the classifier 230 using the following two sub-steps:
   3.1 Assign tags to all the instances of factoids identified by the classifier 230; and
   3.2 Train the classifier using the instances and their tags assigned in step. 3.1.

Figure 4:
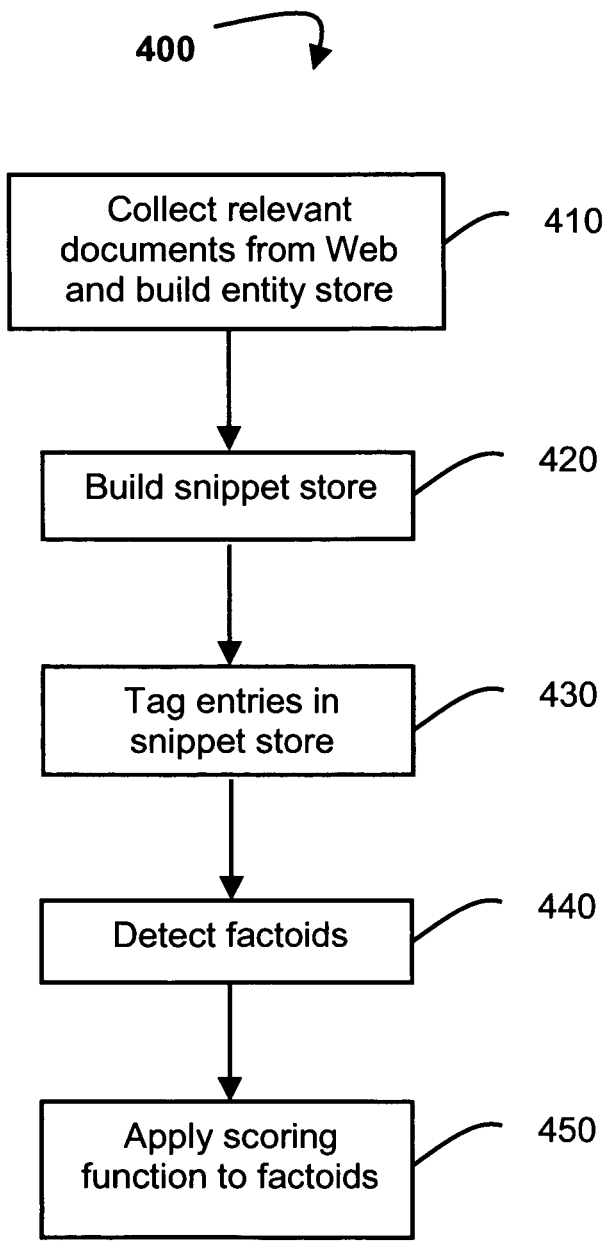
FIG. 4 shows a schematic flow diagram of a deployment phase where trigger events are extracted using the classifier trained in the training phase shown in FIG. 2.

Having described the training phase 200 of the method of extracting factoids for a given factoid category from content automatically sourced from the Web, the deployment phase is next described with reference to FIG. 4 wherein a schematic flow diagram of the deployment phase 400 is shown. The deployment phase 400 starts in step 410 where documents that are relevant to a given set of entities are collected from the Web and placed in an entity store. The documents are identified by performing a Web search through a search engine wherein a set of queries pertaining to the entities is used. Hence, each of the documents collected is relevant to the given set of entities due to the fact that at least one of the entities in the set appears therein. In one implementation this step is accomplished using IBM's WebFountain™ store and indexer. WebFountain™ is a Web-scale mining and discovery platform that extracts trends, patterns, and relationships from massive amounts of unstructured and semi-structured text.

Next, in step 420, a snippet store is built from the entity store. In particular, the content of each of the documents in the entity store is processed to extract there from a collection of sentences (snippets) that contain at least one of the entities in the set. As described with reference to the training phase, alternative methods may be used to extract snippets from a document.

In step 430 that follows the set of annotations 220 (FIG. 2) developed during the training phase 200 is used to annotate the snippets from the snippet store by tagging entities contained therein in the manner described above with reference to the training phase 200. The tagged (annotated) snippets are then returned to the snippet store.

The classifier 230 (FIG. 2) for the given factoid category trained during the training phase 200 is then used in step 440 to detect relevant snippets from the snippet store built in step 420 and annotated in step 430. In particular, the annotated snippets in the snippet store are individually passed to the classifier 230. The snippets that are classified as positive by the trained classifier 230 for the given factoid category are designated as being factoids for that factoid category. A confidence score is also given to each factoid identified by the classifier, with the confidence score being in the range (0;1].

Typically several factoids may result from step 440 for each entity in the given set of entities and for the given factoid category, each factoid having an associated confidence score. Several classifiers 230 may be trained for different factoid categories relevant to the industry of the set of companies under consideration, in which case factoids associated with each factoid category may be identified.

Step 450 that follows applies a scoring function to the factoids associated with each entity, thereby achieving an overall score for each entity in the set of entities under consideration. The overall score of each entity indicates that entity's relevance to the factoid category under consideration. In an alternative implementation a scoring function is applied to the factoids associated with the entities to obtain a separate score for each factoid category associate with each of the entities.

To achieve step 450 all the factoids that refer to the same actual event are grouped. The grouping may be done through an exact match of the factoids. The grouping of factoids may also be done by extracting fields relevant to a particular factoid category, such as company name and revenue growth figure for a "revenue growth" factoid category, and then matching the extracted fields across different factoids. After the grouping of factoids that refer to the same actual event for a company, the overall score to the company is calculated using the various groupings of factoids. Examples of scoring functions include:

The overall score is a function of the number of factoids extracted for the entity for a particular factoid category.
  The overall score is a function of the number of instances of each factoid weighted by its confidence score for the entity for the particular factoid category.
  The overall score is a function of the language being used in the factoids for the entity for the particular factoid category.

For certain factoid categories it may be appropriate to develop a scoring system specific for that factoid category.

Hence, the deployment phase automatically identifies factoids from the content on the Web, and by using the overall score, also prioritises the entities according to their relevance to the factoid category under consideration.

One application of the system and method for extracting factoids from content automatically sourced from the Web is to identify sales drivers automatically. Most companies are sales driven organizations operating in a competitive market. Speed to market is critical in such an environment. The sooner a potential customer can be drawn into a decision making process for procuring a product or service, the higher the chances are of converting that potential customer into an actual customer. Several companies conduct research and studies to identify sales drivers relevant to the products or services offered by those companies. The existence of such a sales driver for a particular company indicates a strong propensity of new buying from that company.

A sales driver may therefore be defined as a factoid category whose existence indicates good propensity for buying. Examples of sales drivers are: "Revenue Growth", "Change in Management", "Launch of a New Product" and "Merger and Acquisition".

The sales drivers are typically different for companies operating in different industries. As an example, the sales driver: "change of a Chief Information Officer (CIO) of a company" could be a sales driver for a company in the Information Technology (IT) industry, whereas that same statement may not be a sales driver within the steel industry. Accordingly, sales drivers for any industry are typically determined based upon expert opinions in that industry.

In order to identify the set of companies to target for sales, a company needs to identify other companies that have some trigger events associated with them based on the given sales drivers for that industry. A trigger event is an event that occurs in the context of a company (or its environment), and describes the occurrence of a sales driver, hence it is an indicator of that company's propensity to purchase additional goods and/or services. As an example, "Company X appoints Mr. Y as its CIO" is an example trigger event (factoid) for a "change of a CIO of a company" sales driver (factoid category). As such a sales driver has been indicated above as being a sales driver in the IT industry, knowledge of this trigger event occurring is valuable for any company in the IT industry. Other example trigger events are "Company X reported a revenue growth of 10% in the fourth quarter" and "Company Y acquired company Z for n billion dollars".

Hitherto the identification and extraction of trigger events have been entirely manual. The set of companies for which it has to be established whether or not a trigger event has occurred based upon given sales drivers is typically known, but often comprise hundreds of thousands. Interviews are often conducted with the Chief Information Officers (CIOs), Chief Executive Officers (CEOs) and Chief Financial Officers (CFOs) of private industry companies and government organizations to identify valuable trigger events. Due to the large number of companies in the set it is prohibitive to call representatives from each company or organization to find out the required information.

The method and system described herein may be used on the set of companies, as the set of entities, to identify trigger events (factoids) relating to one ore more sales drivers (factoid categories) associated with the industry of interest.

The foregoing describes only some embodiments of the present invention, and modifications and/or changes can be made thereto without departing from the scope and spirit of the invention, the embodiments being illustrative and not restrictive.

We claim:

1. A method of extracting factoids associated with a given factoid category of a plurality of categories from text repositories, said method comprising the steps of:
  training a classifier to recognise factoids relevant to said given factoid category;
  collecting, by a processor within a computer, documents or document summaries relevant to said given factoid category from the text repositories and storing the documents or document summaries in an entity store;
  extracting sentences having a predetermined association to said given factoid category from said documents or said document summaries; and
  classifying, in a noisy environment, said sentences using said classifier to extract snippets containing phrases relevant to said given factoid category, said extracted snippets being said factoid associated with said given factoid category, and storing the snippets in a snippet store.

2. A method according to claim 1 wherein said collecting step comprises performing a search of the text repositories, wherein said documents are referenced by the results of said search.

3. A method according to claim 2 wherein said search is performed on text repositories using a search engine.

4. A method according to claim 1 comprising the further step of annotating entities in said sentences according to said given factoid category before said classifying step is performed.

5. A method according to claim 1 comprising the further step of ordering said factoids associated with said given factoid category.

6. A method according to claim 1 wherein said training step includes generating a collection of documents related to said given factoid category by querying the text repositories.

7. A method according to claim 2 wherein example instances of the given factoid category are treated as input queries for said search on the text repositories.

8. A method according to claim 7 wherein strongly correlated example instances are treated as input queries for said search on the text repositories.

9. A method according to claim 6, wherein said training step further includes appending to said collection of documents related to said given factoid category a collection of manually generated documents that are strongly related to said given factoid category.

10. A method according to claim 4 wherein said entities are replaced in said sentences by associated annotation types.

11. A method according to claim 4 comprising the further step of filtering said sentences after said annotation step and before said classifying step by selecting the sentences containing a pre-determined combination of entities having a pre-determined ordering of said entities.

12. A method according to claim 4 wherein said collecting step comprises performing a search of the text repositories using a search phrase, wherein said documents are referenced by the results of said search, and said method comprises the further step of filtering said sentences after said annotation step and before said classifying step by selecting only said sentences containing said search phrase.

13. A method according to claim 5 comprising the further step of ordering said factoids based upon a scoring function applied to the snippets associated with each factoid.

14. A method according to claim 13 wherein said ordering is done based on a score that is assigned to each factoid, with said score being a function of a confidence score applied when classifying said sentences.

15. A method according to claim 13 comprising the further step of annotating entities in said sentences according to said given factoid category before said classifying step is performed, and during said ordering step, all factoids related to respective entities are grouped in order to assign an overall score to respective entities, where said overall score is the basis for said scoring function.

16. A method as claimed in claim 15 wherein said overall score assigned to respective entities is a function of the number of factoids related to respective entities.

17. A method as claimed in claim 15 wherein said overall score assigned to respective entities is a function of the number of instances of each related factoid weighted by a confidence score associated with that factoid.

18. A method according to claim 15 wherein the overall score assigned to respective entities is a function of the language being used in each related factoid.

19. An apparatus for extracting factoids associated with a given factoid category of a plurality of factoid categories from text repositories, said apparatus comprising:
    means for training a classifier to recognise factoids relevant to said given factoid category;
    means for collecting documents or document summaries relevant to said given factoid category from the text repositories;
    means for extracting sentences having a predetermined association to said given factoid category from said documents or said document summaries;
    means for classifying, in a noisy environment, said sentences to extract snippets containing phrases relevant to said given factoid category, said extracted snippets being said factoid associated with said given factoid category, and
    a memory to store the snippets in a snippet store within the memory.

20. A computer program product comprising a machine-readable storage medium having machine-readable program code recorded thereon for controlling the operation of a data processing apparatus on which the program code executes to perform a method of extracting factoids associated with a given factoid category of a plurality of factoid categories from text repositories, said method comprising the steps of:
    training a classifier to recognise factoids relevant to said given factoid category;
    collecting documents or document summaries relevant to said given factoid category from the text repositories;
    extracting sentences having a predetermined association to said given factoid category from said documents or said document summaries;
    classifying, in a noisy environment, said sentences using said classifier to extract snippets containing phrases relevant to said given factoid category, said extracted snippets being said factoid associated with said given factoid category; and
    storing the snippets on a snippet store.

* * * * *